United States Patent [19]

Naitoh et al.

[11] Patent Number: 4,648,010

[45] Date of Patent: Mar. 3, 1987

[54] SOLID ELECTROLYTIC CAPACITOR AND PROCESS FOR PREPARATION THEREOF

[75] Inventors: Kazumi Naitoh, Yokohama; Takashi Ikezaki, Atsugi; Saburo Shimodaira, Izumi, all of Japan

[73] Assignee: Showa Denko Kabushiki Kaisha, Tokyo, Japan

[21] Appl. No.: 902,834

[22] Filed: Sep. 2, 1986

[30] Foreign Application Priority Data

| Sep. 3, 1985 | [JP] | Japan | 60-193184 |
| Sep. 3, 1985 | [JP] | Japan | 60-193185 |
| Oct. 25, 1985 | [JP] | Japan | 60-237585 |
| Apr. 24, 1986 | [JP] | Japan | 61-093451 |

[51] Int. Cl.$^4$ ............ H01G 9/00; H01G 7/00
[52] U.S. Cl. ............ 361/433; 29/25.42
[58] Field of Search ............ 361/315, 322, 433; 29/25.42

[56] References Cited

U.S. PATENT DOCUMENTS 3,619,387 11/1971 Mindt et al. ............ 361/433 X

FOREIGN PATENT DOCUMENTS 76357  7/1978 Japan ............ 29/25.42
843785 8/1960 United Kingdom ............ 29/25.42

Primary Examiner—Donald A. Griffin
Attorney, Agent, or Firm—Sughrue, Mion, Zinn, Macpeak & Seas

[57] ABSTRACT

Disclosed is a solid electrolytic capacitor made of a structural body comprising a metal having a valve action, an oxide film formed on the surface of the metal, a semiconductor layer composed of a mixture of lead dioxide and lead sulfate, which is formed on the oxide film and, formed on the semiconductor layer, (a) a carbon layer, (b) a metal layer or (c) a carbon layer and a metal layer formed thereon. The semiconductor layer is formed by chemically depositing a mixture of lead dioxide and lead sulfate on the oxide film from a reaction mother liquid containing lead ions and persulfate ions.

16 Claims, No Drawings

# SOLID ELECTROLYTIC CAPACITOR AND PROCESS FOR PREPARATION THEREOF

BACKGROUND OF THE INVENTION (1) Field of the Invention

The present invention relates to a solid electrolytic capacitor consisting of a structural body comprising a metal having a valve action, an oxide film formed on the surface of the metal, a semiconductor layer composed of a mixture of lead dioxide and lead sulfate, which is formed on the oxide film, and a carbon layer and/or a metal layer formed on the semiconductor layer, and a process for the preparation thereof.

(2) Description of the Related Art

A solid electrolytic capacitor using lead dioxide as the semiconductor layer is known, as disclosed in Japanese Examined Patent Publication No. 58-21,414. Since the semiconductor layer of lead dioxide in this conventional solid electrolytic capacitor is formed by thermal decomposition of a lead ion-containing reaction mother liquid on the oxide film, the oxide film is thermally cracked or is chemically damaged by a gas generated by the thermal decomposition. Therefore, when a voltage is applied to this defective solid electrolytic capacitor, an electric current is concentrated on a defective portion of the oxide film, and there is a risk of insulation breakdown. Accordingly, in order to increase the reliability of the voltage resistance, the formation voltage should be 3 to 5 times the rated voltage, and a large anode body having a large surface area should be used so as to obtain a predetermined capacitance.

As means for overcoming these defects, there is known a method in which manganese nitrate is thermally decomposed to form a layer of manganese dioxide on an oxide film layer, the manganese dioxide layer is immersed in a liquid containing lead ions and persulfate ions at very low concentrations, and a layer of lead dioxide is formed on the manganese dioxide layer by chemical deposition, as disclosed, for example, in Japanese Unexamined Patent Publication No. 54-12,447. However, this method has a problem such that, since a thermal reaction is carried out for formation of the manganese dioxide layer, thermal cracking of the oxide film or chemical damage by a generated gas cannot be avoided.

Furthermore, there is known a method in which lead dioxide is chemically deposited on an oxide film layer, as disclosed in Japanese Examined Patent Publication No. 49-29,374. However, this method has a problem such that, since a silver ion is necessary as a catalyst for the chemical deposition of lead dioxide, when this method is applied to the production of a solid electrolytic capacitor as intended in the present invention, silver or a silver compound adheres to the dielectric oxide film and the insulation resistance is reduced.

As means for eliminating the foregoing defects, there is known a method in which a tetracyanoquinodimethane salt, which is an organic semiconductor, is used as the solid electrolyte (see, for example, Japanese Unexamined Patent Publication No. 57-173,928). However, the tetracyanoquinodimethane salt is very expensive and the salt is easily affected by moisture.

SUMMARY OF THE INVENTION

It is a primary object of the present invention to provide a solid electrolytic capacitor having a high collecting effect, which is made of a structural body comprising a semiconductor layer composed of a lead dioxide/lead sulfate mixture, which can be formed on an oxide film in an industrially advantageous manner.

Another object of the present invention is to provide a process for the preparation of a solid electrolytic capacitor, which comprises the step of forming a semiconductor layer composed of a lead dioxide/lead sulfate mixture on a dielectric film layer without utilizing a thermal decomposition reaction or using a catalyst having an adverse influence on the capacitor performance, such as a silver catalyst.

In accordance with one aspect of the present invention, there is provided a solid electrolytic capacitor made of a structural body comprising a metal having a valve action, an oxide film formed on the surface of the metal, a semiconductor layer composed of a mixture of lead dioxide and lead sulfate, which is formed on the oxide film, and, formed on the semiconductor layer, (a) a carbon layer, (b) a metal layer or (c) a carbon layer, and a metal layer formed thereon.

In accordance with another aspect of the present invention, there is provided a process for the preparation of a solid electrolytic capacitor, which comprises forming an oxide film on the surface of a metal having a valve action, chemically depositing a mixture of lead dioxide and lead sulfate on the oxide film from a reaction mother liquid containing lead ions and persulfate ions to form a semiconductor layer, and forming on the semiconductor layer (a) a carbon layer, (b) a metal layer or (c) a carbon layer, and a metal layer thereon.

DESCRIPTION OF THE PREFERRED EMBODIMENTS

As the metal having a valve action, there can be used, for example, tantalum, aluminum, and niobium, but among these metals, aluminum is preferred. The metal having a valve action is ordinarily used in the form of a foil.

The oxide film formed on the metal foil is preferably composed of an oxide of the same metal as that of the metal foil. Any known method can be adopted for the formation of the oxide film on the surface of the metal foil. For example, if the surface of an aluminum foil is chemically etched and is electrochemically treated in an aqueous solution of ammonium borate, an alumina dielectric layer is formed on the aluminum foil.

A semiconductor layer composed of a mixture of lead dioxide and lead sulfate is formed on the oxide film. When the semiconductor layer is made of lead dioxide acting as a conductor and lead sulfate acting as an insulator, the leak current value of the capacitor can be reduced by the incorporation of lead sulfate. However, the electroconductivity of the semiconductor layer is reduced by this incorporation of lead sulfate and, for example, the loss factor is increased. Nevertheless, if has been found that the performance of the capacitor can be maintained at a level higher than that of the conventional solid electrolytic capacitor.

A good capacitor performance can be maintained throughout such a broad range of the lead dioxide/lead sulfate ratio in the mixture wherein the content of lead dioxide is 10 to 95% by weight and the content of lead sulfate is 90 to 5% by weight. An especially good balance is obtained between the leak current value and the loss factor if the mixture consists essentially of 20 to 50% by weight, preferably 25 to 35% by weight, of lead dioxide and 80 to 50% by weight, preferably 75 to 65% weight, of lead sulfate. If the content of lead dioxide is lower than 10% by weight, the electroconductivity is unsatisfactory, and therefore, the loss factor is increased and a sufficient capacitance can not be obtained. If the content of lead dioxide is higher than 95% by weight, the lead current value is increased and the intended objects of the present invention cannot be attained.

The semiconductor layer composed of the lead dioxide/lead sulfate mixture can be formed by chemical deposition from a reaction mother liquid containing lead ions and persulfate ions. As the reaction mother liquid, an aqueous solution is used containing lead ions and sulfate ions.

The lead ion seed and the persulfate ion seed are not particularly critical. As typical instances of the compound giving a lead ion seed, there can be mentioned lead citrate, lead acetate, basic lead acetate, lead borofluoride, and lead sulfate hydrate. As typical instances of the compound giving a persulfate ion seed, there can be mentioned ammonium persulfate, potassium persulfate, and sodium persulfate. A mixture of two or more of these compounds giving a lead ion seed or sulfate ion seed may be used.

The lead ion concentration in the reaction mother liquid is 0.1 to 7 mole/l preferably 1.3 to 5 mole/l. If the lead concentration is higher than 7 mole/l, the viscosity of the reaction mother liquid becomes too high and it is difficult to use the reaction mother liquid. If the lead ion concentration is lower than 0.1 mole/l, the frequency of the coating operation should be increased because of a low lead ion concentration in the reaction mother liquid. The persulfate ion concentration in the reaction mother liquid is such that the molar ration of the sulfate ion to the lead ion is in the range of from 0.05 to 5, preferably from 0.5 to 3. If this molar ratio is larger than 5, an unreacted sulfate ion is left and the manufacturing cost is increased, and if this molar ration is smaller than 0.05, an unreacted lead ion is left and the electroconductivity is unsatisfactory.

A solution formed by simultaneously dissolving a compound giving a lead ion seed and a compound giving a sulfate ion seed in water may be used as the reaction mother liquid, or a method may be adopted in which an aqueous solution of a compound giving a lead ion seed and an aqueous solution of a compound giving a sulfate ion seed are separately prepared and are mixed just before use.

The ratio between lead dioxide and lead sulfate in the semiconductor layer may be changed by the addition of an oxidant such as hydrogen peroxide. The amount of the oxidant can be determined based on the results of preliminary experiments, while taking the intended balance between the loss factor and leak current value in the capacitor into consideration. In general, it is preferable that the amount of the oxidant be equimolar or less to the persulfate ions present in the reaction mother liquid. If the amount of the oxidant is too large, the reaction becomes runaway.

The oxidant used includes, for example, hydrogen peroxide, calcium hypochlorite, calcium chlorite, calcium chlorate, calcium perchlorate, chromic acid, potassium permanganate and sodium chlorate.

As the means for deposition of the semiconductor layer, there can be mentioned a method in which the metal having a valve action and an oxide film formed thereon is immersed in the reaction mother liquid (an aqueous solution containing lead ions and persulfate ions) or is coated with the reaction mother liquid to allow the reaction mother liquid to intrude into the oxide film, the metal is then allowed to stand, and the metal is water-washed and dried.

On the semiconductor layer, (a) a metal layer or (b) a carbon layer is formed, or (c) a carbon layer is formed and then a metal layer is formed thereon. The method for forming a carbon layer on the semiconductor layer of lead dioxide and lead sulfate is not particularly critical, but a known method, for example, a method comprising coating a carbon paste, may be adopted.

In the present invention, as means for forming a metal layer on the carbon layer, a method may be adopted comprising coating a paste containing, for example, silver, aluminum or copper; a method comprising vacuum-depositing a metal such as silver, aluminum or copper, or a method comprising plating with a metal such as nickel or copper.

The manner in which lead terminals are connected to the metal having a metal action and the semiconductor layer is not particularly limited. Any conventional manner may be employed. For example, the terminal can be connected to the aluminum foil (anode) by caulking or high-frequency welding. The terminal can be connected to the semiconductor layer (cathode) by applying a conductive paste or soldering.

The solid electrolytic capacitor of the present invention is advantageous over known solid electrolytic capacitors in the following points.

(1) Since the semiconductor layer can be formed on the oxide film layer without heating at a high temperature, there is no risk of damaging the oxide film and anodic oxidation (re-formation) need not be performed for repair. Accordingly, the rated voltage can be increased to a level several times the level attained in the conventional capacitors, and the size can be reduced, compared with the conventional capacitors, to obtain the same capacitance and rated voltage.

(2) The leak current value is small.

(3) The voltage resistance is high.

(4) Since the electroconductivity of the semiconductor layer is $10^{-1}$ to $10^{1}$ S.cm$^{-1}$, and is sufficiently high, therefore the impedance is low.

(5) The high-frequency characteristic is good.

(6) The equivalent series resistance is low.

The solid electrolytic capacitor of the present invention has many applications and can be used in many fields with exterior parts such as a resin mold, a resin case, a metal case, resin dipping and a laminate film.

The present invention will now be described in detail with reference to the following examples and comparative examples.

EXAMPLE 1

The surface of an aluminum foil (having a purity of 99.99%) having a thickness of 100 $\mu$m was electrochemically etched by using the foil as an anode and applying a direct current and an alternating current alternately to form an oxide layer having an average pore diameter of 2 $\mu$m and a specific surface area of 12 m$^2$/g. The etched aluminum foil was electrochemically treated in a solution of ammonium borate to form a thin layer (alumina layer) on the aluminum foil.

An aqueous solution containing 2.0 mole/l of lead acetate trihydrate was mixed with an aqueous solution containing 2.5 mole/l of potassium persulfate to obtain a reaction mother liquid. This reaction mother liquid was immediately coated on the dielectric thin layer, and the coated dielectric thin layer was allowed to stand under a reduced pressure for 3 hours to form a lead dioxide-containing semiconductor layer on the dielectric thin layer. The semiconductor layer was then washed with water and dried at 110° C. under a reduced pressure for 3 hours. By mass analysis, X-ray analysis, the infrared spectral analysis, it was found that the formed semiconductor layer consisted of a mixture comprising about 28% by weight of lead dioxide and about 72% by weight of lead sulfate.

A silver paste was coated on the dried semiconductor layer and dried, and a cathode lead line was connected to the silver paste and resin sealing was effected. Thus, a solid electrolytic capacitor was prepared.

EXAMPLE 2

A solid electrolytic capacitor was prepared in the same manner as described in Example 1 except that a reaction mother liquid formed from an aqueous solution containing 3.5 mole/l of lead acetate trihydrate and an aqueous solution containing 4.2 mole/l of ammonium persulfate was used instead of the reaction mother liquid prepared from the aqueous solution of lead acetate trihydrate and the aqueous solution of potassium persulfate.

It was found that the semiconductor layer of the solid electrolytic capacitor consisted of a mixture comprising about 33% by weight of lead dioxide and about 67% by weight of lead sulfate.

COMPARATIVE EXAMPLE 1

A semiconductor layer composed solely of lead dioxide was formed on the same aluminum foil having the dielectric layer as used in Example 1 by the known method of the thermal decomposition of lead nitrate. Then, in the same manner as described in Example 1, a silver paste was coated and dried on the lead dioxide layer, and in the same manner as described in Example 1, a solid electrolytic capacitor was prepared.

COMPARATIVE EXAMPLE 2

A solid electrolytic capacitor prepared in the same manner as described in Example 2 except that $8 \times 10^{-5}$ mole of silver nitrate was added to the reaction mother liquid.

EXAMPLE 3

A solid electrolytic capacitor was prepared in the same manner as described in Example 2 except that an aqueous solution containing 0.05 mole/l of hydrogen peroxide was added to the reaction mother liquid of lead acetate trihydrate and ammonium persulfate.

It was found that the semiconductor layer of the solid electrolytic capacitor consisted of a mixture comprising about 45% by weight of lead dioxide and about 55% by weight of lead sulfate.

Characteristic values of the solid electrolytic capacitors prepared in the foregoing examples are shown in Table 1.

TABLE 1

| | Capacitance (μF) | Tan δ* (%) | Leak current** (μA) |
|---|---|---|---|
| Example 1 | 2.15 | 0.2 | 0.03 |
| Example 2 | 2.42 | 0.4 | 0.05 |
| Example 3 | 2.58 | 0.5 | 0.08 |
| Comparative Example 1 | 2.31 | 9.6 | 8.2 |
| Comparative Example 2 | 2.35 | 1.5 | 9.6 |

TABLE 1-continued

| | Capacitance (μF) | Tan δ* (%) | Leak current** (μA) |
|---|---|---|---|

Note
*value as measured at 120 Hz
**value as measured at 25 V

EXAMPLE 4

A solid electrolytic capacitor was prepared in the same manner as described in Example 1 except that a carbon paste was coated on the semiconductor layer instead of the silver paste.

EXAMPLE 5

A solid electrolytic capacitor was prepared in the same manner as described in Example 2 except that a carbon paste was coated on the semiconductor layer instead of the silver paste.

COMPARATIVE EXAMPLE 3

A solid electrolytic capacitor was prepared in the same manner as described in Comparative Example 1 except that a carbon paste was coated on the semiconductor layer instead of the silver paste.

COMPARATIVE EXAMPLE 4

A solid electrolytic capacitor was prepared in the same manner as described in Comparative Example 2 except that a carbon paste was coated on the semiconductor layer instead of the silver layer.

COMPARATIVE EXAMPLE 5

In the same manner as described in Example 4, a solid electrolytic capacitor was prepared by coating a reaction mother liquid formed by mixing 250 ml of a solution of 0.3 mole of lead acetate in concentrated ammonium acetate, 1 l of a saturated aqueous solution of ammonium persulfate and $8 \times 10^{-5}$ mole of silver nitrate, as disclosed in Japanese Examined Patent Publication No. 49-29,374, on the same dielectric thin layer as described in Example 1.

The semiconductor layer of the obtained solid electrolytic capacitor was composed solely of lead dioxide.

Characteristic values of the solid electrolytic capacitors prepared in Examples 4 and 5 and Comparative Examples 3, 4, and 5 are shown in Table 2.

TABLE 2

| | Capacitance (μF) | tan δ* (%) | Leak current** (μA) |
|---|---|---|---|
| Example 4 | 0.61 | 0.7 | 0.04 |
| Example 5 | 0.60 | 0.6 | 0.06 |
| Comparative Example 3 | 0.62 | 7.2 | 6.4 |
| Comparative Example 4 | 0.58 | 5 | 8 |
| Comparative Example 5 | 0.63 | 25 | 15 |

Note
*measured at 120 Hz
**measured at 25 V

EXAMPLE 6

A solid electrolytic capacitor was prepared in the same manner as described in Example 1 except that a method comprising coating and drying a carbon paste on the dried semiconductor layer and further coating a silver paste on the carbon paste layer was adopted instead of the method comprising coating the silver paste on the dried semiconductor layer.

EXAMPLE 7

A solid electrolytic capacitor was prepared in the same manner as described in Example 2 except that a method comprising coating and drying a carbon paste on the dried semiconductor layer and further coating a silver paste on the carbon paste was adopted instead of the method comprising coating the silver paste on the dried semiconductor layer.

COMPARATIVE EXAMPLE 6

A solid electrolytic capacitor was prepared in the same manner as described in Comparative Example 1 except that a method comprising coating and drying a carbon paste on the dried semiconductor layer and further coating a silver layer on the carbon paste was adopted instead of the method comprising coating the silver paste on the dried semiconductor layer.

COMPARATIVE EXAMPLE 7

A solid electrolytic capacitor was prepared in the same manner as described in Comparative Example 2 except that a method comprising coating and drying a carbon paste on the dried semiconductor layer and further coating a silver paste on the carbon paste was adopted instead of the method comprising coating the silver paste on the dried semiconductor layer.

EXAMPLE 8

Sintered tantalum powder was anodically oxidized in an aqueous solution of phosphoric acid to form a dielectric film on the sintered body.

A reaction mother liquid was prepared by mixing an aqueous solution containing 2.2 mole/l of lead acetate trihydrate with an aqueous solution containing 2.6 mole/l of ammonium sulfate. The sintered body having the dielectric layer was immediately immersed in the reaction mother liquid and allowed to stand under a reduced pressure for 3 hours, whereby a lead dioxid-containing semiconductor layer was formed on the dielectric film. The semiconductor layer was then washed with water and dried at 110° C. under a reduced pressure for 3 hours. The immersion and drying operation was repeated two times. It was found that the formed semiconductor layer consisted of a mixture comprising about 25% by weight of lead dioxide and about 75% by weight of lead sulfate.

A carbon paste was coated and dried on the dried semiconductor layer and a cathode was taken out by a silver paste, and the capacitor was placed in a case and resin sealing was performed to obtain a solid electrolytic capacitor.

The characteristic values of the solid electrolytic capacitors prepared in Examples 6, 7 and 8 and Comparative Examples 6 and 7 are shown in Table 3.

TABLE 3

|  | Capacitance (μF) | tan δ* (%) | Leak current** (μA) |
| --- | --- | --- | --- |
| Example 6 | 0.98 | 0.2 | 0.03 |
| Example 7 | 1.10 | 0.3 | 0.04 |
| Example 8 | 0.95 | 0.3 | 0.03 |
| Comparative Example 6 | 1.02 | 9.4 | 7.0 |
| Comparative Example 7 | 1.08 | 1.2 | 11.2 |

TABLE 3-continued

|  | Capacitance (μF) | tan δ* (%) | Leak current** (μA) |
| --- | --- | --- | --- |
| Example 7 |  |  |  |

Note
*measured at 120 Hz
**measured at 25 V

EXAMPLE 9

The surface of an aluminum foil having a length of 5 cm and a width of 0.3 cm was electrochemically etched by using the foil as an anode and applying an alternating current.

After the etched aluminum foil was caulked with an anode terminal, the foil was electrochemically treated in a solution of boric acid and ammonium borate to obtain an etched aluminum foil having an alumina layer (about 2 μF/cm²).

An aqueous solution containing 1.8 mole/l of lead acetate trihydrate was mixed with an aqueous solution containing 1.0 mole/l of ammonium persulfate at 50° C. to obtain a reaction mother liquid. This reaction mother liquid was immediately coated on the alumina layer, and the coated layer was allowed to stand at 90° C. for 3 hours to form a lead dioxide-containing semiconductor layer on the dielectric thin layer. The semiconductor layer was then washed with water and dried at 100° C. under a reduced pressure. By mass analysis, X-ray analysis, the infrared spectral analysis, it was found that the formed semiconductor layer consisted of a mixture comprising about 28% by weight of lead dioxide and about 72% by weight of lead sulfate.

A carbon paste and then a silver paste were coated on the dried semiconductor layer and dried at room temperature. A cathode lead line was connected to the solidified silver paste by soldering and resin sealing was effected. Thus, a solid electrolytic capacitor was prepared.

EXAMPLE 10

A solid electrolytic capacitor was prepared in the same manner as described in Example 9 except that the concentration of ammonium persulfate was changed to 0.3 mole/l.

It was found that the semiconductor layer of the solid electrolytic capacitor consisted of a mixture comprising about 35% by weight of lead dioxide and about 65% by weight of lead sulfate.

EXAMPLE 11

A solid electrolytic capacitor was prepared in the same manner as described in Example 9 except that 0.05 mole/l of hydrogen peroxide was incorporated in the reaction mother liquid.

It was found that the semiconductor layer of the solid electrolytic capacitor consisted of a mixture comprising about 50% by weight of lead oxide and about 50% by weight of lead sulfate.

EXAMPLE 12

A solid electrolytic capacitor was prepared in the same manner as described in Example 9 except that 0.2 mole/l of hydrogen peroxide was incorporated in the reaction mother liquid.

It was found that the semiconductor layer of the solid electrolytic capacitor consisted of a mixture comprising about 94% by weight of lead oxide and about 6% by weight of lead sulfate.

The characteristic values of the solid electrolytic capacitors prepared in Examples 9, 10, 11 and 12 are shown in Table 4.

TABLE 4

| | $PbO_2$ content in semiconductor layer wt. % | Capacitance ($\mu F$) | tan δ* (%) | Leak current** ($\mu A$) | ESR ($\Omega$) |
|---|---|---|---|---|---|
| Example 9 | 28 | 2.1 | 3.2 | 0.08 | 20 |
| Example 10 | 35 | 2.0 | 2.7 | 0.15 | 17 |
| Example 11 | 50 | 1.8 | 2.0 | 0.39 | 14 |
| Example 12 | 94 | 1.6 | 1.5 | 0.52 | 12 |

Note
*measured at 120 Hz
**measured at 25 V

We claim:

1. A solid electrolytic capacitor made of a structural body comprising a metal having a valve action, an oxide film formed on the surface of the metal, a semiconductor layer composed of a mixture of lead oxide and lead sulfate, which is formed on the oxide film and, formed on the semiconductor layer, (a) a carbon layer, (b) a metal layer or (c) a carbon layer and a metal layer formed thereon.

2. A solid electrolytic capacitor as set forth in claim 1, wherein the semiconductor layer is composed of a mixture comprising 10 to 95% by weight of lead dioxide and 90 to 5% by weight of lead sulfate.

3. A solid electrolytic capacitor as set forth in claim 1, wherein the semiconductor layer is composed of a mixture comprising 20 to 50% by weight of lead dioxide and 80 to 50% by weight of lead sulfate.

4. A solid electrolytic capacitor as set forth in claim 1, wherein the metal having a valve action is selected from the group consisting of aluminum, tantalum and niobium.

5. A solid electrolytic capacitor as set forth in claim 1, wherein the metal having a valve action is aluminum and the oxide film formed thereon is composed of alumina.

6. A solid electrolytic capacitor as set forth in claim 1, wherein the metal layer is composed of silver, aluminum or copper.

7. A process for the preparation of a solid electrolytic capacitor, which comprises forming an oxide film on the surface of a metal having a valve action, chemically depositing a mixture of lead dioxide and lead sulfate on the oxide film from a reaction mother liquid containing lead ions and persulfate ions to form a semiconductor layer, and forming on the semiconductor layer (a) a carbon layer, (b) a metal layer or (c) a carbon layer and a metal layer thereon.

8. A process according to claim 7, wherein the lead ion concentration in the reaction mother liquid is 0.1 to 7 mole/l and the molar ratio of the persulfate ion to the lead ion is in the range of from 0.05 to 5.

9. A process according to claim 7, wherein the lead ion concentration in the reaction mother liquid is 1.3 to 5 mole/l and the molar ratio of the persulfate ion to the lead ion is in the range of from 0.5 to 3.

10. A process according to claim 7, wherein an oxidant is incorporated in the reaction mother liquid whereby the proportion of the deposited lead dioxide and lead sulfate is controlled.

11. A process according to claim 10, wherein the amount of the oxidant is equimolar or less to the persulfate ions.

12. A process according to claim 10, wherein the oxidant is hydrogen peroxide.

13. A process according to claim 7, wherein the metal having a valve action is selected from the group consisting of aluminum, tantalum and niobium.

14. A process according to claim 7, wherein the metal having a valve action is aluminum and the oxide film formed on the metal having a valve action is composed of alumina.

15. A process according to claim 7, wherein the carbon layer is formed by coating a carbon paste.

16. A process according to claim 7, wherein the metal layer is formed by coating a paste of silver, aluminum or copper or vacuum-depositing silver, aluminum or copper.

* * * * *